Oct. 3, 1961 J. P. NORTON ET AL 3,002,681
PERFORATED TAPE READER
Filed Aug. 27, 1956 8 Sheets-Sheet 1

WILLIAM F. DALEY,
JAMES P. NORTON,
INVENTORS

BY [signature]
ATTORNEY

Oct. 3, 1961 J. P. NORTON ET AL 3,002,681

PERFORATED TAPE READER

Filed Aug. 27, 1956 8 Sheets-Sheet 2

WILLIAM F. DALEY,
JAMES P. NORTON,
INVENTORS

BY [signature]
ATTORNEY

WILLIAM F. DALEY,
JAMES P. NORTON,
INVENTORS.

BY

ATTORNEY.

PERFORATED TAPE READER

WILLIAM F. DALEY,
JAMES P. NORTON,
INVENTORS.

BY

ATTORNEY.

WILLIAM F. DALEY,
JAMES P. NORTON,
BY
ATTORNEY

WILLIAM F. DALEY,
JAMES P. NORTON,
INVENTORS.

BY

ATTORNEY.

Oct. 3, 1961 J. P. NORTON ET AL 3,002,681

PERFORATED TAPE READER

Filed Aug. 27, 1956 8 Sheets-Sheet 7

WILLIAM F. DALEY,
JAMES P. NORTON,
INVENTORS.

BY [signature]

ATTORNEY.

WILLIAM F. DALEY,
JAMES P. NORTON,
INVENTORS.
BY
ATTORNEY.

United States Patent Office 3,002,681

Patented Oct. 3, 1961

3,002,681
PERFORATED TAPE READER

James P. Norton and William F. Daley, Los Angeles, Calif., assignors to Hughes Aircraft Company, Culver City, Calif., a corporation of Delaware Filed Aug. 27, 1956, Ser. No. 606,354
2 Claims. (Cl. 235—61.11)

This invention relates generally to perforated record reading apparatus and systems and more particularly to systems and apparatus of this general nature for reading and handling records in strip or tape form.

Commercial apparatus of this type usually involves a row of spring loaded pins operated in timed sequence with the tape feeding and indexing mechanism which incremently moves the tape in one direction. During each instant, when the tape is stopped by the feeding and indexing mechanism, the spring loaded reading pins are advanced into reading position with respect to the tape. In this position, certain of the pins may pass through perforations in the tape and certain other of the pins may engage the tape and be arrested in their movement with respect to the tape. Thus, the displacement of the pins is indicative of the presence or absence of perforations in the tape and in accordance with a suitable convention of binary code, the pin positions are indicative of a particular condition. Presently available commercial arrangements are capable of feeding the tape in one direction only. This is satisfactory in many applications. However, in certain applications wherein speed of tape handling and accuracy in final results represents criteria which must be obtained, arrangements of this type are inadequate.

One such application is found in machine tool automation by digital means. In such applications, any error existing in the perforated code in the tape may result in a gross error in a machine or assembly operation performed by the automation system which may ruin the part on which the machine or assembly operation is being performed. Consequently, it is highly desirable that arrangements be provided whereby the system is self-checking, at least for errors of a common nature, and which further provides for rechecking of the tape code at the point where a seeming error exists, so that in the event the error was the result of malfunction of some part of the system and not of the code the operation may be continued, assuming of course that the machine malfunction did not occur a second time.

Frequently, perforated tape readers are provided with supply and take-up reels, the tape being fed from the supply reel to the take-up reel during tape movement in the forward reading direction through the tape reader. These reels are provided with electric motors which must be controlled so that the tape is fed into the reader and wound up at the exit side of the reader in such a way as to minimize tape tension between either of the reels and the feeding and indexing station in the reader. The checking of tape errors requires that the reader and the reels be reversible in operation. By way of explanation of the nature of such an error, the arrangement may be set up so that the code depends upon odd numbers of holes appearing in any single row of perforations in the tape. Thus, a mistake of one hole or perforation in the tape, termed a parity error, which is a common variety of error, would result in the appearance of an even number of holes in any single row. The equipment receiving the information from the position of the pins may thus be organized to reject any code involving an even number of tape perforations. Also, even though an odd number of perforations may exist, it is conceivable that relays or other switching devices responsive to pin positions may operate improperly which would also produce an indication of a parity error. In either event, it is desirable at this point to bring the operation to a stop, reverse the tape to a predetermined point beyond the seeming error in the tape and thereafter reread the tape a second time to check the condition. Occurrence of the error a second time may then be utilized to completely stop the operation to determine the source of the error.

To accomplish this, provision must be made to reverse the feeding and indexing mechanism and at the same time to reverse one or both of the motor drives for the reels to effect tape reversal. Thereafter, the reverse feed must be stoppd and the reader started up in the forward direction which requires restoring the operation of the tape feeding and indexing mechanism together with the reel drives to their original conditions in which the tape is fed in a forward direction for reading.

Accordingly, one object of this invention is to provide a perforated record reader apparatus and system which is simple with respect to operational requirements and positive in operation.

Another object of this invention is to provide a tape reading apparatus and system providing a parity check of the code on the tape.

A further object of this invention is to provide a perforated tape handling arrangement operable in forward and reverse directions.

Still another object of this invention is to provide a tape handling apparatus which is automatically reversible in dependence of an error of a predetermined character in the perforated code in the tape.

Further to the preceding object, it is an object hereof to provide a tape reading arrangement of the character referred to wherein reverse reading of the tape takes place in dependence of a perforated code error of predetermined character and wherein after the reverse reading has proceeded to a predetermined point beyond the error, the tape feed is again reversed to initiate tape reading in the forward direction.

It is also an object of this invention to provide an apparatus of the character referred to having tape rewinding facilities for totally rewinding the tape on the tape supply reel.

Still another object of this invention is to provide apparatus of the character referred to providing tape rewinding facilities for rewinding only a particular message portion of the tape after the message has been completely read.

The foregoing statements are merely illustrative of the various aims and objects of this invention. Other objects and advantages will become apparent from a study of the following specification when considered in conjunction with the accompanying drawings, in which.

Figure 1:
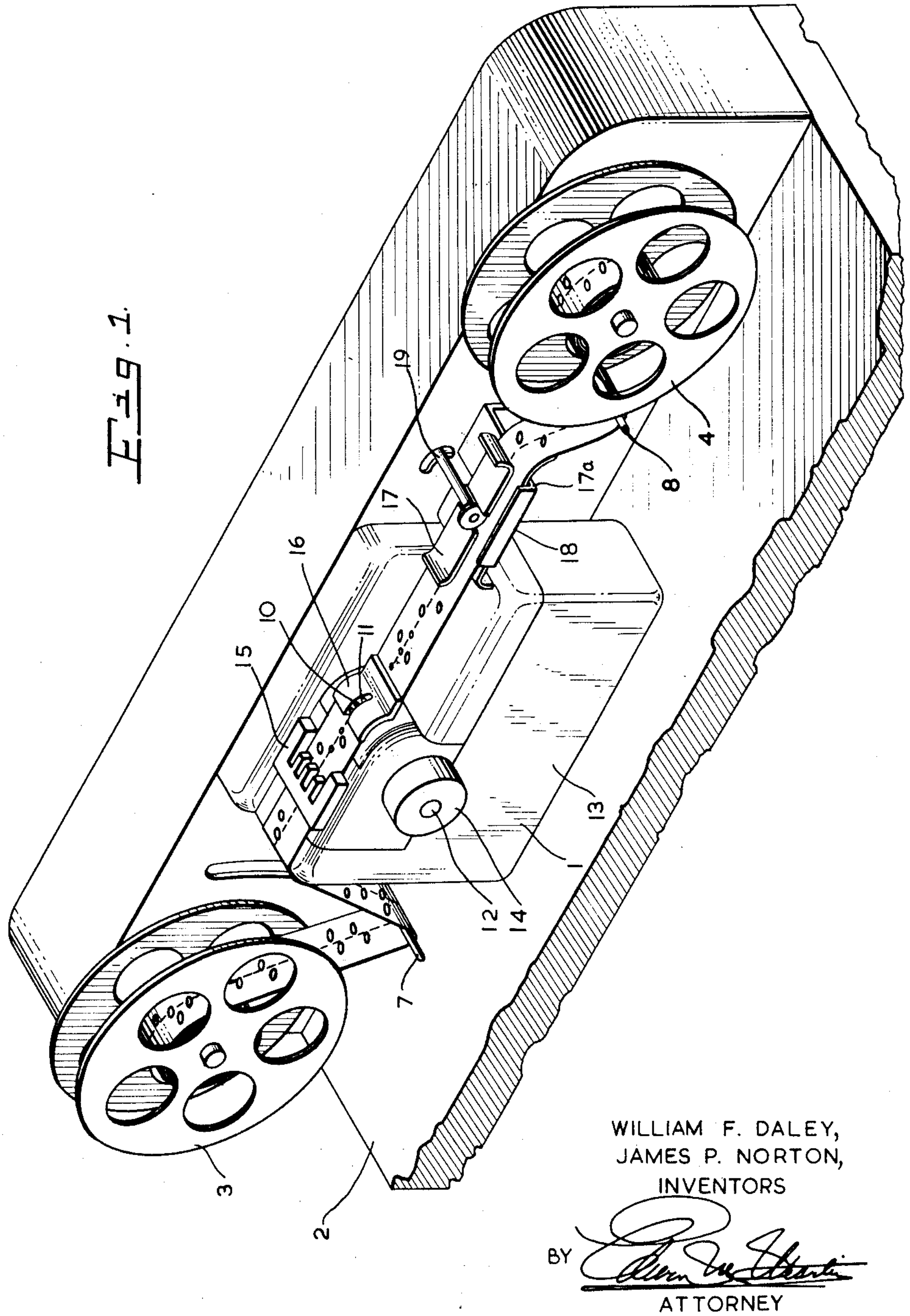
FIG. 1 is a perspective view of a perforated tape handling apparatus embodying the principles of this invention.

The perspective illustration of FIG. 1 illustrates the general organization of the main components of the tape handling apparatus. The arrangement illustrated comprises a tape reader generally designated 1, disposed substantially centrally on the upper side of housing 2. Reels 3 and 4 are rotatably mounted at opposite ends of the tape reader 1, reel 3 being the supply reel and reel 4 being the take-up reel. The tape is fed normally in a forward direction from the supply reel 3 through the perforated tape reader 1 and thereafter is wound up on the take-up reel 4. The reels 3 and 4 are powered by respective electric motors 5 and 6. These motors appear only in the wiring diagram in FIGS. 6*a*, 6*b* and 6*c* for this system and are not shown at this point in the interest of simplicity. Each of motors 5 and 6 is arranged in a suitable electrical control circuit yet to be described adapted to be controlled in part by respective tape tension arms 7 and 8 which are suitably pivotably mounted so that the tape engaging portions are gravity biased or spring loaded, if required, into engagement with the paper tape. The purpose of these arms is to provide suitable control over the respective reel motors 5 and 6 so that the tape is never tensioned as a result of improper supply, or take-up of the tape which has been read.

Movement of the tape through the tape reader 1 is controlled by a feeding and indexing mechanism which drives a sprocket wheel generally designated 10 having a plurality of circumferentially spaced sprocket teeth 11 which engage correspondingly spaced holes arranged in a line substantially centrally along the paper tape. The sprocket wheel 10 is mounted on a shaft 12 extending externally of the housing 13 which encloses the tape reader mechanism. A thumb wheel 14 is mounted on the end of shaft 12 so that manual rotation of the sprocket wheel 10 may be effected as needed.

As will be seen by reference to FIG. 1 the perforated tape is fed from the supply reel 3 across the top of housing 13 and passes under a forked tape guide 15 between the tines of which the reader pins (not shown) are adapted to pass. The tape proceeds from guide 15 beneath a slotted guide 16 having an arcuate shaped portion, positioned over portions of the sprocket wheel on opposite sides of the sprocket teeth 11, which maintains the tape in positive engagement with the sprocket teeth. The tape continues across the top of housing 13 extending through a third guide 17, passing from guide 17 beneath tension arm 8 and thereafter being wound upon the take-up reel 4.

A contact roller 18 mounted on a control arm 19 is operable between a position in which it rotatably rides an edge of the tape and a second position in which it disengages the tape. As will be explained hereinafter in connection with FIGS. 6*a*, 6*b* and 6*c*, this roller and its contact plate 17*a* constitute a stop switch SS in an electrical circuit which is completed through suitably positioned holes in the tape. Normally when the tape is being read in the forward direction, that is, tape movement from left to right as viewed in FIG. 1, suitable means are provided such as a stop switch magnet SSM, to lift roll 18 off the tape to minimize frictional drag. However, during a message rewind operation, roll 18 is moved into a position engaging the tape. The holes which are detected by the contact roll 18 are positioned on the tape margin at the beginning of a message indicating the start of the code. Thus, during rewind of the particular message, the contact roller is separated from the bottom section 17*a* of guide 17, which functions as the stationary portion of the electrical contact arrangement SS, so that the circuit controlled by the contact roller is maintained open until the hole in the tape indicating the start of the code moves the contact roller. This completes the electric circuit which operates to stop the rewind operation at this point.

For a total rewind operation when the tape is to be removed and replaced by another tape, the control afforded by the contact roller 18 is eliminated and the tape is totally rewound onto supply reel 3 so that it may be completely removed and replaced by a reel having a different code.

Figure 2:
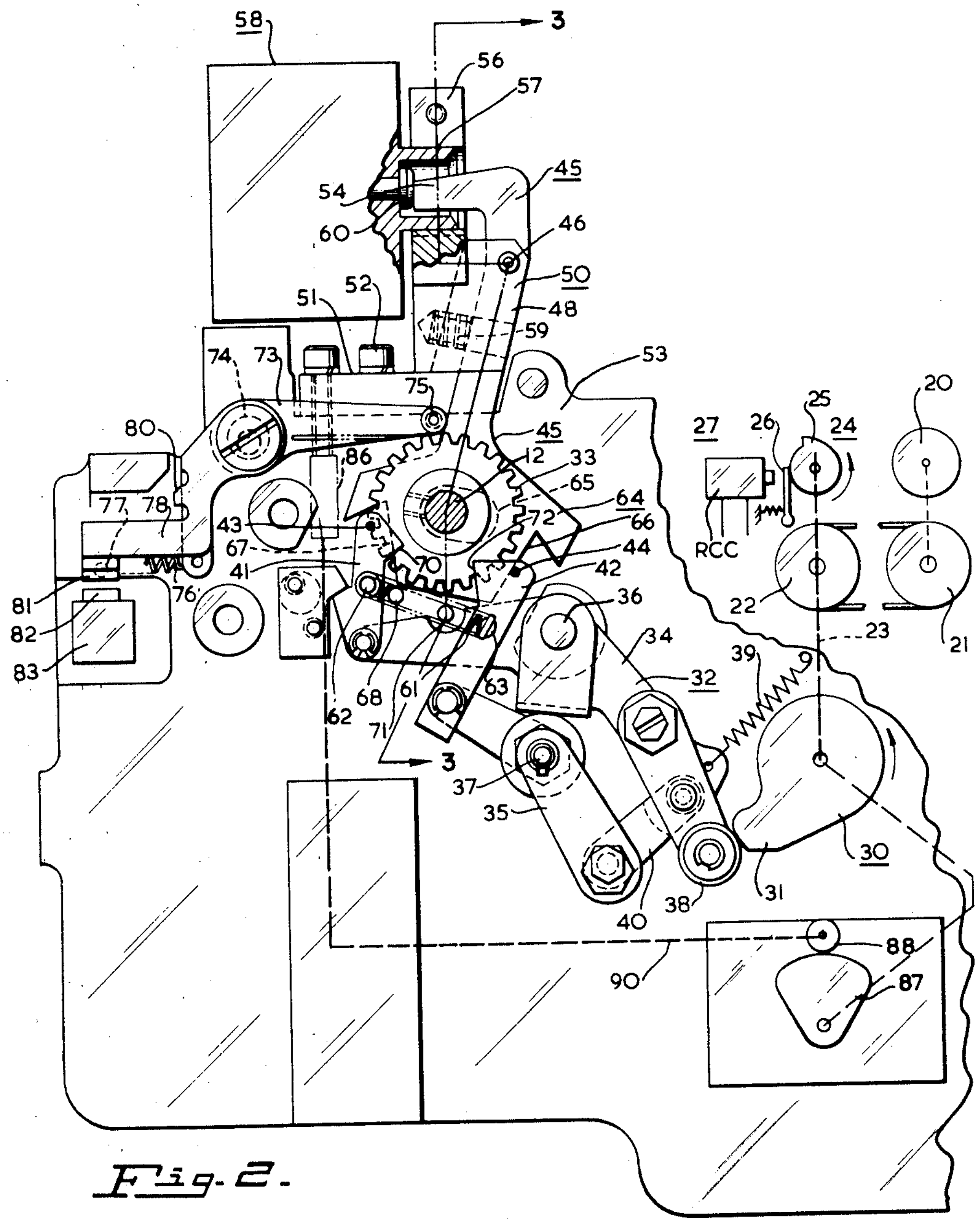
FIG. 2 is an elevational view fragmentarily in section illustrating certain mechanical details of the perforated tape feeding mechanism of the tape reader arrangement.
Figure 3:
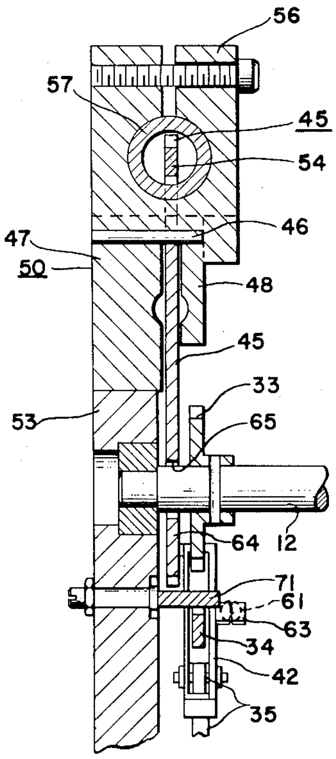
FIG. 3 is a sectional view taken on the line 3—3 of FIG. 2.
Figure 6:
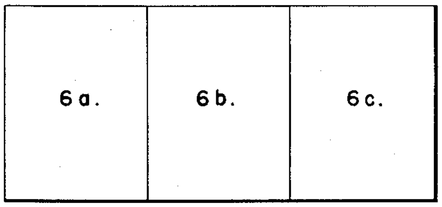
FIGS. 6*a*, 6*b* and 6*c* diagrammatically illustrate a circuit arrangement forming a part of the perforated tape reading system and utilized to control the apparatus of FIG. 2.
Figure 4:
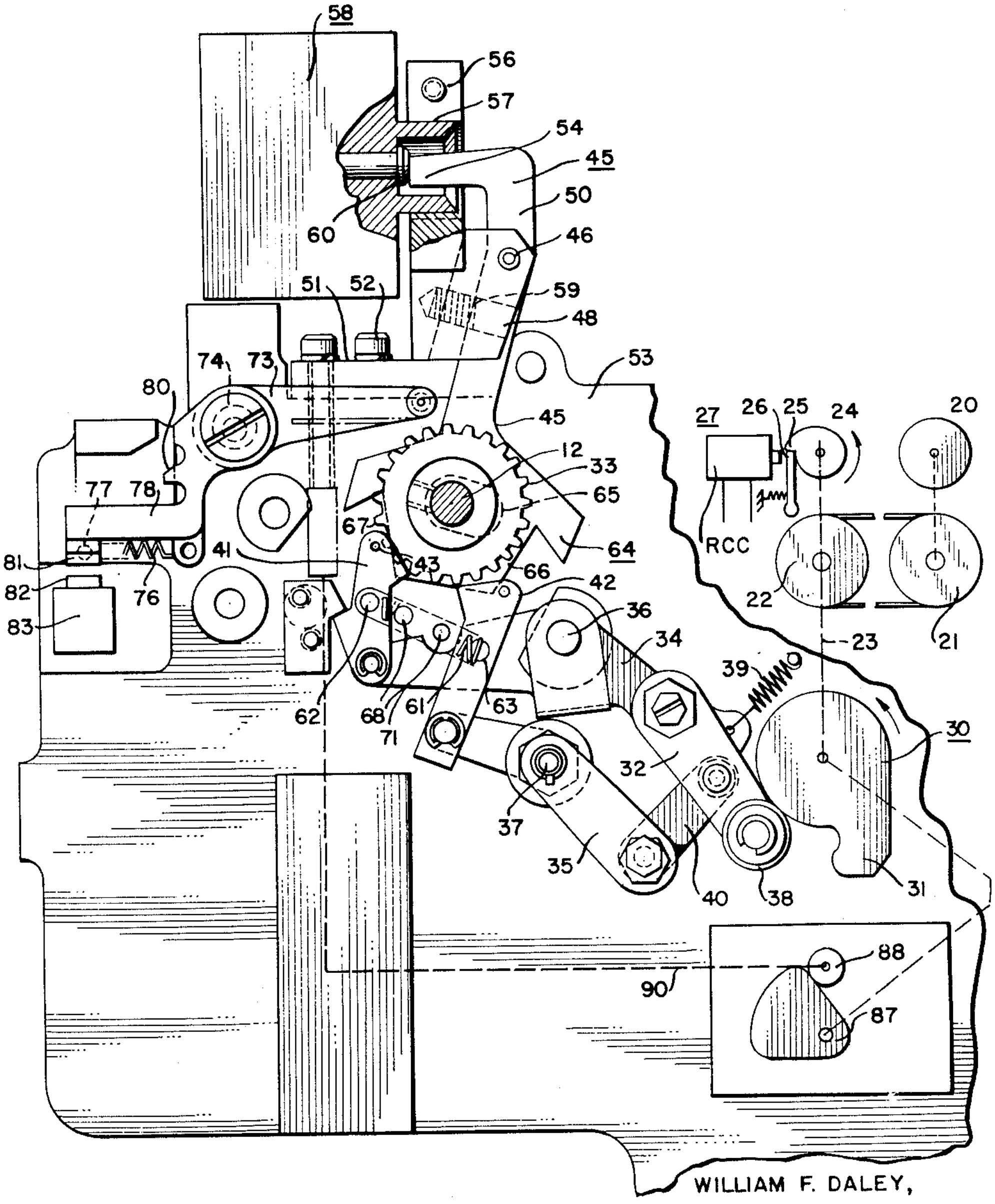
FIG. 4 illustrates the mechanism of FIG. 2 in a different operating position.
Figure 5:
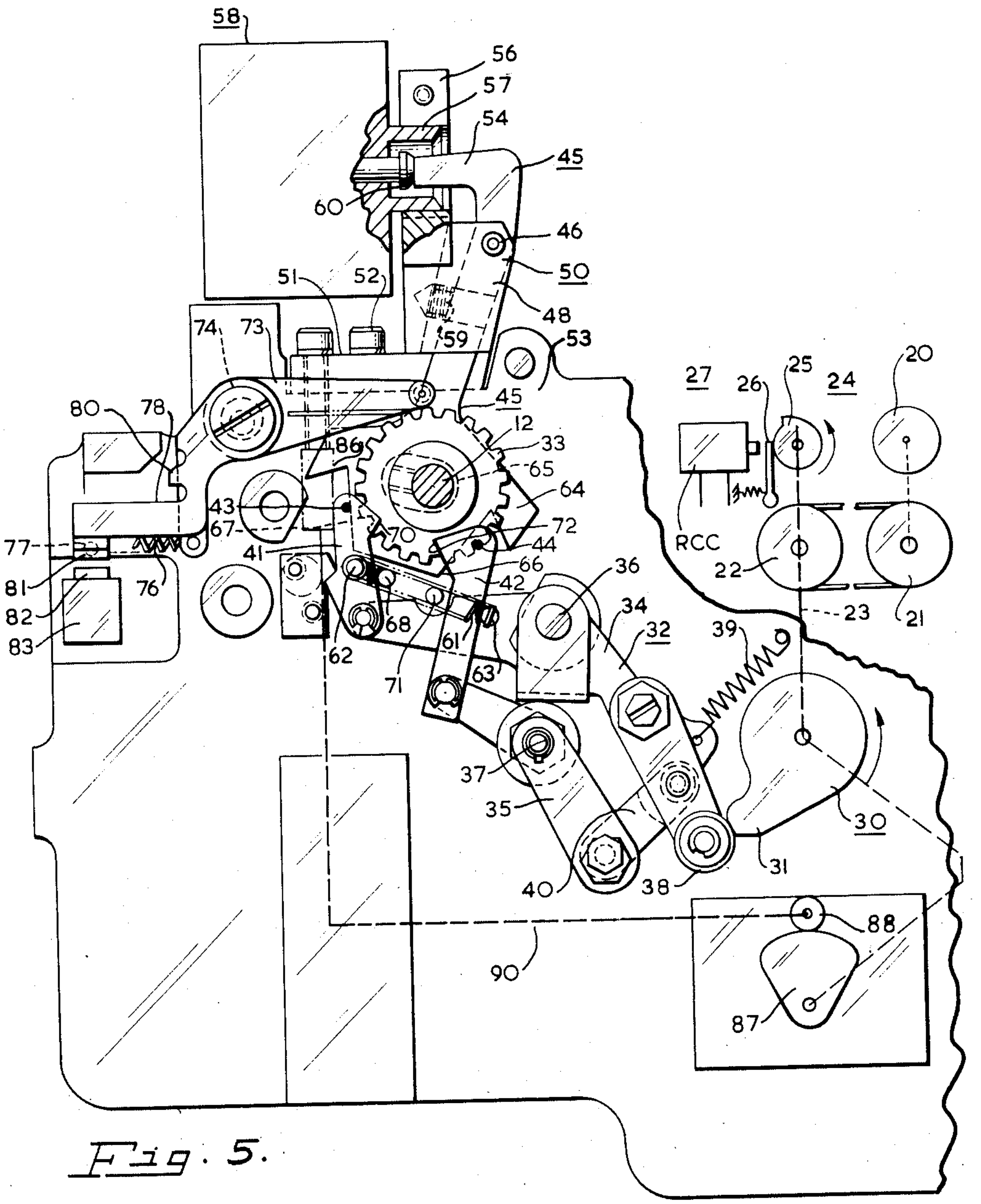
FIG. 5 illustrates the mechanism of FIG. 2 in a still different operating position.

The mechanical arrangements whereby the various operations referred to above and others may be accomplished appear in FIGS. 2 and 3 which illustrate the components of the mechanical assembly in one operational position, FIGS. 4 and 5 indicating other operational positions.

Referring to FIGS. 2 through 5 the tape reader apparatus 1 is driven by an electric motor 20 of any suitable type which is constantly energized during the operation of the reader and which operates at substantially constant speed. Motor 20 drives a pulley 21 which is belt-connected to a pulley 22, connected by means of a spring-loaded friction clutch, not shown, to a shaft 23 which constitutes the input shaft to the reader. Thus, at any time when the shaft 23 is secured against rotation, pulley 22 rotates with respect to the shaft and whenever the shaft is released the friction forces are sufficient to afford a positive drive of the shaft for the torque loading imposed thereon by the feeding and pin reading mechanisms. Rotation of the shaft 23 is controlled by a conventional type of single revolutional clutch, generally designated 24, herein referred to as the reader clutch, which is provided with a peripheral projection or stop 25 adapted to be engaged by a spring loaded latch 26. This latch may be operated in any suitable manner. The control herein indicated involves an electromagnet 27 disposed in flux linking relationship with latch 26 so that upon energization of the reader clutch coil RCC the latch may be withdrawn from the position indicated engaging stop 25 to release the clutch. For the purposes of this invention, coil RCC may be maintained constantly energized excepting during initiation of reversing operation of the tape sprocket wheel 10 at which time the electromagnet 27, as will be described hereinafter, is de-energized to permit engagement of the latch 26 with stop 25. Although not herein illustrated, latch 26 may be additionally actuated by means of a cam driven by the shaft 23 controlling a suitable lever which engages and moves latch 26 in a direction to engage the clutch surface. These and other equally obvious expedients will be apparent to those skilled in the art.

Shaft 23 is connected to and drives a feed cam 30 having a single projection 31 controlling a drive link assembly generally designated 32. This drive link assembly incrementally rotates a ratchet wheel 33 which is secured to drive the shaft 12 which mounts the tape sprocket wheel 10. (See FIG. 3.) Shaft 23 always rotates in one direction, as indicated by the arrow adjacent the cam 30 in FIG. 2.

Drive link assembly 32 comprises a pair of pivotally mounted, parallel connected, cam actuated levers 34 and 35 respectively. Lever 34 is pivotally mounted about a stationary stub shaft 36 and lever 35 is pivotally mounted about a stationary stub shaft 37. Lever 34 is provided with a cam follower roller 38 which rides the surface of feed cam 30. A tension spring 39 connected to lever 34 applies a counter-clockwise bias thereto sufficient to maintain roller 38 in contact with the surface of cam 30. Thus, the lever 34 is moved between the position indicated and a counter-clockwise position as seen in FIG. 4 wherein the roller 38 rides against the circular portion of the cam 30. Movement of lever 34 is imparted to lever 35 by means of a link 40 pivotally connected between the links 34 and 35. Thus, as the cam roller is displaced by rotation of the cam 30, both of the links 34 are moved between the position shown in FIG. 2 and a counter-clockwise position shown in FIG. 4.

The free ends of levers 34 and 35 pivotally mount respective drive links 41 and 42, the free extremities of which carry respective drive pins 43 and 44. These free extremities are disposed on opposite sides of the ratchet wheel 33 and are controlled to selectively engage the ratchet wheel by means of a shift arm 45. Shift arm 45 is pivotally mounted by pin 46 between spaced side portions 47 and 48 of a vertical support 50 having a horizontal base portion 51 which is bolted by means of bolts 52, to the upper edge of a plate 53 constituting the main mounting or support plate of the reader mechanism. Shift arm 45 is provided with a horizontal projection 54 as seen in FIG. 2. A clamp 56 at the top of vertical support 50 receives a reduced diameter tubular projection 57 of the housing of a reverse feed solenoid 58 having a plunger 60, the end of which engages the end of projection 54 on the shift arm. A compression spring 59 disposed between the support 50 and the shift arm, torques the shift arm in a counter-clockwise direction to the position shown in FIG. 2 when the solenoid is de-energized.

Drive links 41 and 42 are biased towards each other by means of a tension spring 61 which is tensioned between pins 62 and 63 secured in the respective drive links at points intermediate their respective points of pivoting and their free extremities, and in a position affording clearance between the tension spring 61 and the ratchet wheel 33, so that the tension spring will not interfere with ratchet wheel movement. Shift arm 45 is provided with a cam-shaped lower extremity 64 which is disposed between lateral extensions of the respective drive pins 43 and 44 (see FIG. 3). As will be seen in FIG. 3, the shift arm extends downwardly beside the surface of support plate 53 and is provided with a suitable slot 65 which clears the shaft 12 in each of the two positions occupied by the shift arm. For either position of the shift arm 45, either the forward or the reverse drive link rides against the surface of the cam-shaped portion 64 of the shift arm. Thus, as seen in FIG. 2, the drive pin 44 of the reverse drive link 42 rides against cam edge 66 and is thus prevented from engaging notches in the ratchet wheel 33. On the other hand, cam edge 67 is disposed from the path of movement of drive pin 43 of forward drive link 41 and, as a consequence, is not engaged by drive pin 43. Drive pin 43 may thus on its upward movement engage a notch in the ratchet wheel and drive the ratchet wheel a distance corresponding to the pitch of one tooth.

FIG. 5 illustrates the mechanism arranged for reverse drive of the ratchet wheel. For this condition, the solenoid 58 is energized which drives the plunger 60 of the solenoid to the right from the position shown in FIG. 3 to a position determined by the limits of the solenoid travel. Thus, the shift arm is rotated in a clockwise direction to the position indicated. The edge 67 of the shift arm cam 64 now engages drive pin 43 of forward drive link 41 rotating this drive link counter-clockwise to a position in which the drive pin 43 no longer engages the teeth of ratchet wheel 33. In this position cam edge 66 is sufficiently displaced that drive pin 44 of reverse drive link 42 may now engage the teeth of ratchet wheel 33. Thus, as the drive link assembly 32 rotates under the control of feed cam 30, ratchet wheel 33 is rotated in a counter-clockwise direction to feed the tape in a reverse direction.

As will be seen by reference to FIG. 4, whenever the cam roller 38 rides on the substantially circular portion of feed cam 30, both of the drive links 41 and 42 are retracted from engagement with the ratchet wheel 33. When the shift arm is disposed, as illustrated in FIG. 3, so that the ratchet wheel is driven in the forward direction by forward drive link 41, the drive link 41 when retracted is displaced from the ratchet wheel by a stationary pin 68 which is secured in support 53. Pin 68 engages an offset edge 70 on the forward drive link which cams the drive link 41 in a counter-clockwise direction as the link is retracted to positively disengage drive pin 43 from the teeth of ratchet wheel 33 towards the lower end of the retraction stroke. A similar stationary pin 71 cooperates with an offset edge 72 on reverse drive link 42 to correspondingly control the reverse drive link when the shift arm is in the reverse drive position. This has not been illustrated herein but is readily construable from the operation illustrated and described in connection with the forward drive link 41.

Ratchet wheel 33 is positively indexed in each incremental angular position by means of an indexing arm 73 which is pivotally mounted on support 53. This pivotal mounting comprises an eccentric pin 74, adjustment of which shifts the pivot aixs of the indexing arm 73 between positions to the left and to the right of that indicated for the purpose of positively indexing the ratchet wheel in such a position that the reading pins may be indexed with the perforated code on the tape whenever the ratchet wheel is indexed. Positive indexing of the ratchet wheel is obtained by means of a roller 75 rotatably mounted on the free end of indexing arm 75. This arm is spring loaded to detent position by means of a tension spring 76 connected between the other end of the indexing arm 73 and a pin 77 secured in support 53. Provision is made herein for physically displacing the index arm 73 in a counter-clockwise direction to disengage the detent roller 75 from the ratchet wheel 33 so that the ratchet wheel 33 may be free to rotate without the indexing forces acing thereon. This is accomplished by means of a substantially L-shaped arm 78 which is pivotally mounted about the pin 74. This L-shaped arm is provided with an offset section functioning as a shoulder 80 disposed to engage an adjacent edge of the indexing arm 73. The left-hand extremity of the L-shaped arm 78, as viewed, functions effectively as an armature being provided with a pole member 81 confronting a pole 82 of a solenoid or electromagnet 83. Thus, energization of this electromagnet is effective to supply sufficient force to the extremity of the L-shaped arm 78 to overcome the spring loading of the indexing arm 73 provided by spring 76, to rotate the indexing arm in a counter-clockwise direction to disengage the detent roller 75 from the ratchet wheel 33.

The reading pin station is schematically illustrated at 86. This reading pin assembly is controlled by a cam 87 which is driven by shaft 23. A cam roller 88 is arranged in a suitable linkage 90, illustrated only in schematic form in the interest of simplicity. Linkage 90 is conventionally connected to the reading pin assembly to move the reading pins to and from tape reading positions. Cam 87 is indexed with respect to feed cam 30 so that the reading pin assembly is displaced from tape reading position and positively maintained out-of-tape reading position throughout that interval in which the linkage assembly 32 incrementally moves the ratchet wheel 33 to displace the tape during the tape feeding operation. Whenever the tape feed cycle is completed and the tape is locked against further movement by the detent roller 75, continued rotation of shaft 23 in the direction indicated, rotates cam 87 so that roller 88 moves over a lower edge of the cam 87. This physical displacement of roller 88 and the linkage 90 associated therewith displaces the reading pin assembly 86 moving the reading pins into tape reading position.

In a practical embodiment of this invention, the axial position of the reading pins, as determined by the presence or absence of perforations in the tape, are utilized to control suitable switching means between open and closed positions whereby an electrical indication of the axial position of the pins is obtained. Arrangements for detecting the positions of the pins have not been illustrated herein in the interest of simplicity.

The mechanical arrangement described hereinabove provides three main modes of operation, in addition to forward reading and some ancillary operations, in the presence of suitable control of electromagnetic devices 27, 58 and 83. These three modes are as follows:

(1) *Message rewind.*—In the message rewind mode of operation, the tape is rewound from the end of the message to the start of the message which provides complete rewinding of the message which has just been read from the tape. To accomplish this, electromagnet 27 is de-energized, which drops the latch 26 against the surface of the single revolution clutch 24. Thus, as the projection 25 moves counter-clockwise, it is engaged by the latch 26 which stops further rotation of shaft 23 and locks cam 30 in a position such as illustrated in FIG. 4. Energization of the electromagnet 83 rotates the indexing arm 73 counterclockwise to disengage the detent roller 75 from the ratchet wheel. Thus, the ratchet wheel is released so that it may rotate freely during the message rewind operation. At the same time, and referring to FIG. 1, provision is made through the electrical circuits yet to be described to reverse the energizing connections for the respective reel motors so that the reel motors drive the reels in reverse directions. The control of the supply reel motor is such during the rewind operation that this motor is started up under the influence of reduced energization which takes up the slack in the loop of tape adjacent the supply reel and displaces the tension arm 7 upwardly as viewed. During this interval the light tension applied to the tape by tension arm 7 accelerates the tape sprocket wheel 10 which is now freely rotatable and the tape begins to move in the reverse direction through the reader. As the slack is taken up in the tape loop adjacent the take-up reel 4, tension arm 8 associated therewith also moves upwardly as viewed. As the tape speed increases through the tape reader and the respective tension arms move upwardly, indicating that most of the slack is out of the tape, suitable connections are made to increase the energization of the supply reel motor at which time the reel speeds increase and the tape is wound at high speed on the supply reel 3. In this mode of operation, control arm 19 is displaced to engage contact roller 18 of stop switch SS with the tape. When the perforation in the tape indicating the start of the message moves beneath contact roller 18, the electric circuit between contact roller 18 and stationary contact plate 17*a* is completed. This circuit is arranged to de-energize both reel motors and at the same time to control the application of reel brakes (not shown in detail) to stop the respective reels.

(2) *Total rewind.*—In the total rewind mode of operation, the reader drive mechanism is positioned as described in connection with the message rewind mode of operation. This operation is essentially the same as that described for message rewind excepting that provision is made to prevent the contact roller 18 from stopping the reel motors at the start of any particular code or message on the tape. This may be accomplished through other switching arrangements in the circuit including the contact roller 18 or, alternatively, may be accomplished by keeping the contact roller out of physical contact with the tape. The total rewind operation may be initiated and stopped by suitable manual switching means.

(3) *Reverse reading.*—In the reverse reading mode of operation, the incremental feed mechanism is switched from forward to reverse operation and the tape is driven incrementally in a reverse direction by means of the tape sprocket wheel 10. Thus, in this mode of operation which is initiated by a parity error in the tape as earlier described herein, the reader clutch coil RCC is de-energized permitting latch 26 to engage stop 25 to stop shaft 23 with the drive links retracted. Solenoid 58 is energized to move the shift arm 45 to its reverse drive position. Energization of this solenoid takes place only whenever the cam roller 38 rides on the lower part of the feed cam 30, in which position the drive links are completely retracted, as stated, and disengaged from the ratchet wheel 33. This is accomplished by means of the circuit arrangement yet to be described. Whenever the shift mechanism is positioned in the reverse drive position, the reader clutch coil RCC is again energized and the operation of cam 30 continues. The tape is now driven incrementally in the reverse direction with the indexing arm 73 functioning through detent roller 75 to positively index the tape as it is fed in the reverse direction. At the same time, cam 87 is effective to actuate the reading pin assembly 86 between reading and inactive positions. This operation continues a predetermined number of cycles or to the start of the code or message and again whenever cam roller 38 rides over the lower part of cam 30, solenoid 58 is de-energized to shift the drive mechanism to its forward drive position. The tape is now again moved incrementally in a forward direction through the tape reading station. If the parity error does not occur on this second pass of the tape through this pin reading station, the operation continues. If, however, a parity error is again indicated, arrangements are provided to stop the operation at that point.

Figure 6A:
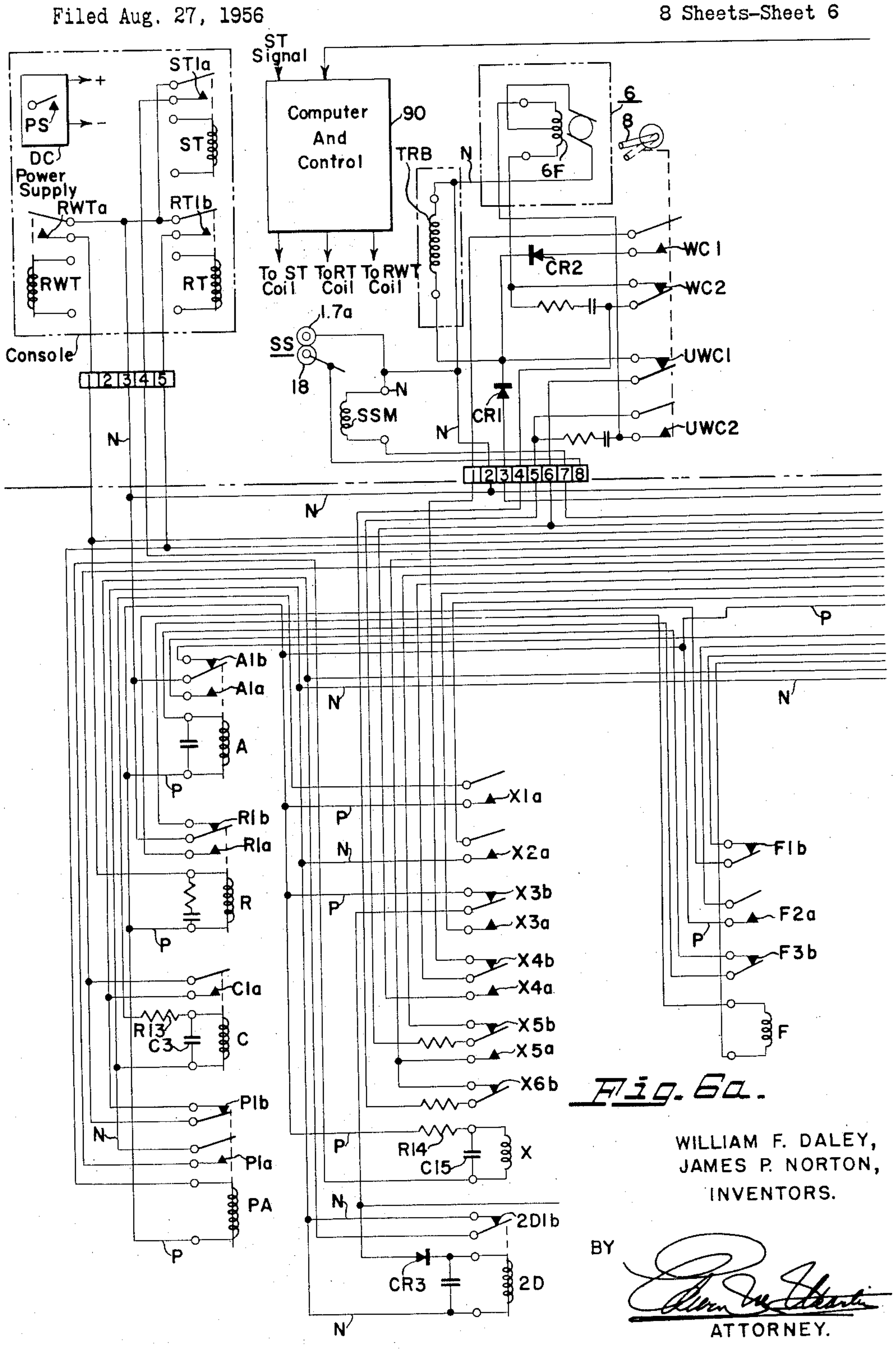
Figure 6B:
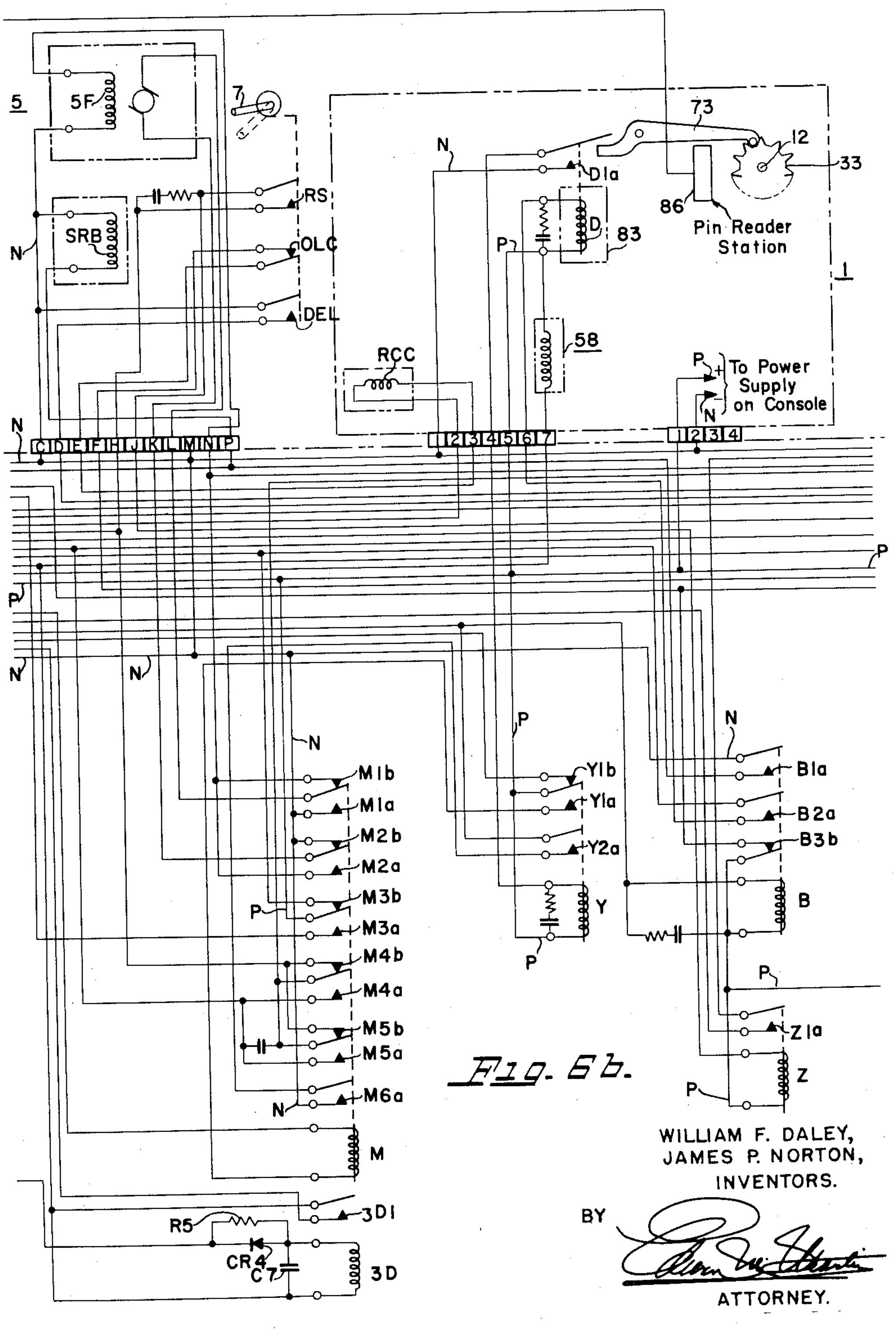
Figure 6C:
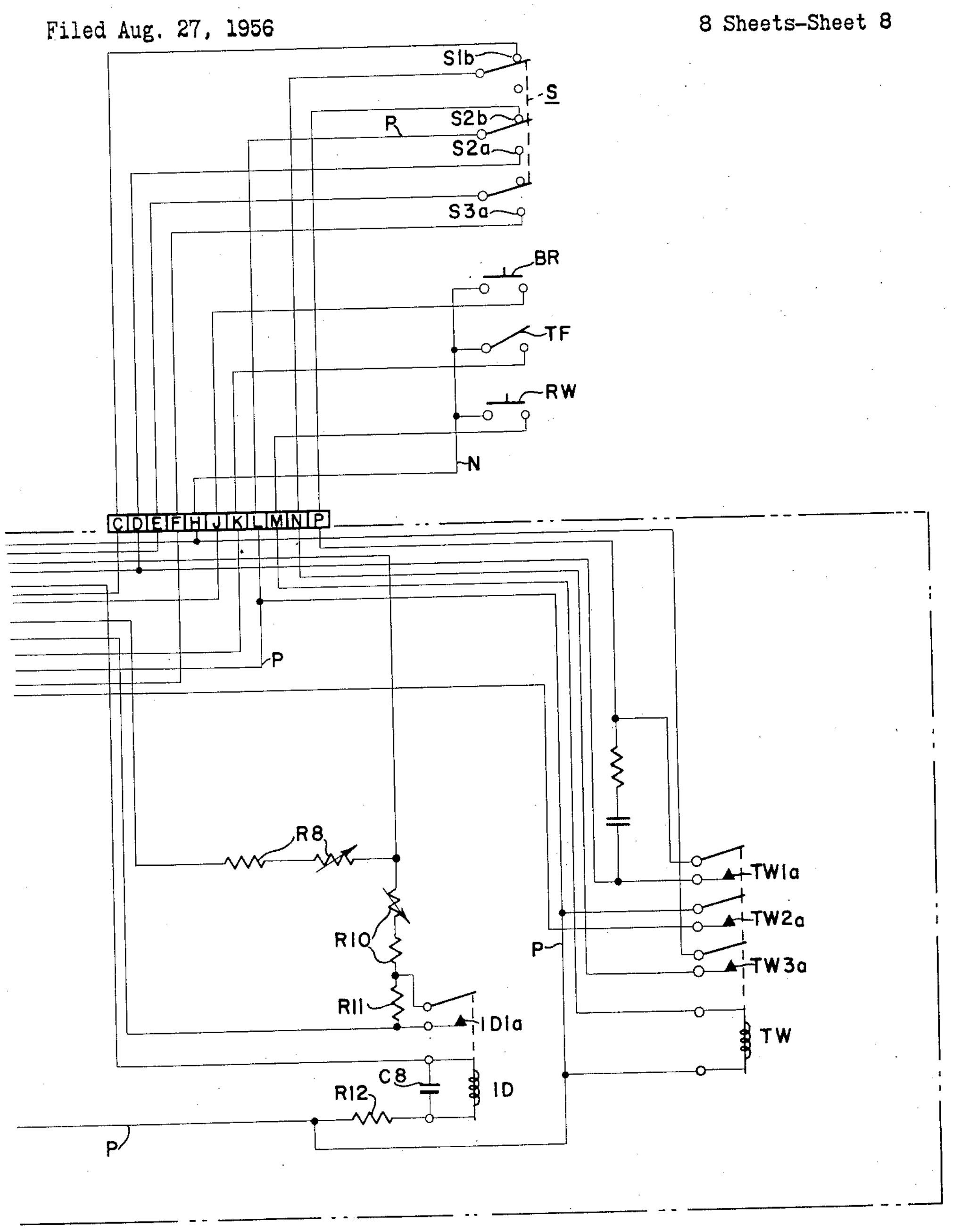

The circuit arrangement illustrated in FIGS. 6*a* through 6*c* provides the control sequence of the electromagnetic devices 27, 58 and 83 to achieve the functional control of the system as hereinabove outlined.

In the circuit as shown, all relays are in their de-energized condition. The tape is assumed to be threaded through the reader with sufficiently large tape loops between the reader and the respective reels that the tension arms 7 and 8, respectively, are in their lower positions. The tape reader feed motor 20 is assumed to be running. This motor, being uncontrolled by the circuit, is not illustrated therein. In this circuit condition, the coil of the clutch electromagnet 27 which controls rotation of the reader drive shaft 23 is de-energized and latch 26 is engaged with projection 25 on the rotary portion of the clutch. Thus, shaft 23 is stationary. Similarly reel drive motors 5 and 6 are de-energized.

*Normal forward reading operation.*—To start the tape, the switch PS in the D.C. power supply at the console is closed which applies direct current to the system over the positive and negative power supply conductors P and N, respectively. To start the tape in the forward direction the coil RCC of the reader clutch 27 must be energized. The circuit for the coil of reader clutch 27 across the power supply conductors includes, normally open contacts F2*a*, normally open contacts Z1*a*, normally open contacts S3*a*, normally closed over-load tape tension contacts OLC1, the coil RCC of reader clutch 27, and normally open contacts ST1*a* of the start tape relay ST. Manually operated switch S is now moved from its "off" position indicated to its "on" position. This opens a contact S1*b* in the circuit for the coil of rewind relay R, opening D.C. power contacts S2*b*, closing D.C. power contacts S2*a* and closing contacts S3*a* in the reader clutch coil circuit. The application of D.C. power to the system through closing of the power switch PS energizes forward relay F, in a circuit across the positive and negative power supply conductors including the normally closed contacts Y1*b* of relay Y, the coil of relay F and normally closed contacts R1*b* of rewind relay R. Contacts F2*a* in the reader clutch coil circuit now close. Relay Z is energized in a circuit including the coil of relay Z, the normally closed contacts P1*b* of parity relay PA and contacts 3D1*a* of relay 3D. Relays 2D and 3D are presently energized since contacts X3*b* of relay X are closed, relay X presently being de-energized. Contacts Z1*a* in the clutch coil circuit now close. This completes the reader clutch coil circuit except for closing of contacts ST1*a* of start tape relay ST.

In this mode of operation the reversing solenoid 58 is de-energized since contacts X2*a*, of relay X, the only contacts which control it, are open. Thus, the shift arm 45 is positioned to permit engagement of forward drive link 41 with the ratchet wheel 33.

The circuit for controlling supply reel motor 5 for forward tape feed includes the normally open contacts S2*a* of manually operated switch S, which switch is now closed, the normally closed contacts M4*b* of relay M, this relay being de-energized in this mode of operation, the reel jogging contacts RJ, resistor R8, resistor R11 which provides slow speed operation of the supply reel motor when shunting contacts 1D1*a* are open, calibrating resistor R10, normally closed contacts M1*b*, the armature of supply reel motor 5 and normally closed contacts M2b. In the forward mode of operation, contacts RJ control the energization of the supply reel motor and close when the tape loop diminishes sufficiently to raise the tension arm 7 the required amount to close contacts RJ. Motor field 5F is energized in shunt relation with the supply reel motor armature.

The circuit controlling take-up reel motor 6 to wind tape passing through the reader includes the now closed contacts S2a of the main switch, normally closed contacts M4b of relay M, normally closed contacts X6b, normally closed contacts WC2, which are controlled by tension arm 8 at the take-up reel, half of the take-up reel motor field 6F and the take-up reel motor armature. Contacts WC2 under the control of tension arm 8 close when the tape loop increases sufficiently. This energizes the motor to take up the slack in the tape. When the loop in the tape at the take-up reel diminishes sufficiently tension arm 8 opens contacts WC2 to de-energize the take-up reel motor 6.

In this mode of operation, the supply reel brake coil SRB is not operated because the motor is operating at relatively low speed and appreciable overrun does not occur. However, the take-up reel brake coil TRB is controlled in a circuit including normally closed contacts M3b, normally closed contacts X4b, contacts WC1 operated by tension arm 8, isolating rectifier CR2 and the coil TRB of the brake. This brake, not shown in detail in the interest of simplicity, is spring released and electromagnetically applied. It may be any suitable type of commercially available friction brake. Contacts WC1 are controlled by tension arm 8 to close and energize brake coil TRB to apply the brake each time the tension arm 8 lifts sufficiently to close the contacts WC1. This movement as previously explained opens contacts WC2 which de-energizes the take-up reel motor circuit.

As stated hereinabove, energization of start tape relay ST closes contacts ST1, completing the final contact link in the circuit for coil RCC of reader clutch 27. Energization of reader clutch coil RCC magnetically moves latch 26 away from the surface of the rotary portion of the clutch, disengaging the latch with stop 25, permitting the reader shaft 23 to rotate to incrementally drive the tape sprocket wheel through ratchet wheel 33 and the drive linkage 32, as previously explained. Start tape relay ST may be energized in any suitable manner. Manual switching may be utilized for this purpose if desired. If used in an automatic machine tool control system, energization of start tape relay ST may be made dependent upon placement of the proper part, upon which an assembly or machine operation is to be performed, on the conveyor line of the system. This may be accomplished through suitable interlocking at the conveyor (not shown), producing an electrical signal for the coil of relay ST which may be fed through a suitable computer and control arrangement 90 indicated only in block form to the coil of relay ST. Such expedients are disclosed only in a general way herein since, per se, they form no part of this invention.

*Reverse reading.*—Provision is made for checking a common variety of error occurring in preparing the tape which is to be used. Usually a special type of tape punch is used to perforate the tape. This punch may be automatically controlled from a keyboard. In this operation, it is not uncommon to punch one hole more or less in a particular row. This type of error can be detected with a minimum of equipment if the code parity is based on an even or odd number of holes in each row of perforation. If an odd parity is chosen, for example, the computer and control may be arranged to reject an even number of holes. Since this sort of error may also result from momentary malfunction of electrical components, such as relays, it is desirable to recheck the tape at the point the seeming parity error occurred. A second parity error occurrence may then be regarded as significant of a tape error or, if not a tape error on inspection, an electrical failure requiring correction. As a practical matter, it may not be feasible to express all the information in a code having an odd number of holes, in which case a separate tape column termed the parity column may be used to insert a parity hole to make an odd number of holes in a given row, the computer discriminating the parity hole from the code.

The mode of operation to be described is actually a reverse reading operation in which the tape movement is reversed by the drive, with incremental indexing in the reverse direction as in the forward direction. The reading pins operate as in the forward direction to engage the tape during revers feed. The reverse feed may be stopped at any point beyond the error by a suitable counting arrangement or the like. In one practical embodiment of this invention, however, it was found desirable to utilize a separate tape column having a single hole at the start of the code. In the forward direction of operation, this hole, indicative of start of code, signals the computer and control 90 that the coded message is about to begin. In the reverse mode of operation, this may be utilized again as an indication of the start of code but at this time to stop the reverse feed of the tape when it is engaged by the start-of-code reading pin. The signal received from the start-of-code pin stops the tape and initiates the shifting cycle to again move the tape in the forward reading direction.

In the system the occurrence of a parity error whether in the tape or through computer and control malfunction results in energization of reverse tape relay RT which closes its contacts RT1a and energizes the coil of parity relay PA. Contacts P1b now open and momentarily de-energize relay Z, the circuit for which also includes contacts 3D1a of relay 3D, which is now energized, and tape feed contacts TF. When relay Z is de-energized, its contacts Z1a in the circuit for the reader clutch coil RCC open and latch 26 engages projection 25 stopping rotation of reader drive shaft 23. Contacts P1a of the parity relay now close. These are the only contacts in the coil circuit of relay X. Contacts X1a close after a delay determined by the time constant of the coil circuit including resistor R14 and capacitor C15 which latter shunts the coil of relay X. Contacts X1a energize relay C. Contacts C1a shunt the contacts P1b, which are now open, in the circuit for the coil of relay Z. However, relay C is time delayed by an RC circuit, including a series resistor R13 and a shunt connected capacitor C3 which delay the pick-up of relay C and consequently delay closing of contacts C1a. The time delay on relay C is about the same as that of relay X. When contacts X3b open relays 2D and 3D are de-energized. Relay 2D drops after a delay but prior to closing of contacts C1a, which closes contacts 2D1b. Closure of contacts X3a shorts the capacitor C7 shunting the coil of relay 3D through a rectifier CR4 which promptly de-energizes the coil. Contacts 3D1a open immediately. Thus, when contacts C1a close the coil of relay Z is energized to again close the circuit for the reader clutch coil RCC.

The coil of solenoid 58 is controlled only by contacts X2a of relay X which is now energized. Relay X time delays energization of shift arm 45 sufficiently to permit the reader clutch 27 to stop shaft 23. Thus, after stopping of the reader drive shaft 23, as described, contacts X2a energize the coil of solenoid 58 to reverse the shift arm position, shifting the drive linkage 32 for reverse feed of the tape. Momentarily, thereafter, relay Z is energized by closing of contact C1a and D1b and the reverse feed operation of the tape begins.

This operation continues, for example, until the start-of-code reader pin (not shown) in the pin reader assembly 86 detects the start of code hole in the tape. At this point, the signal current to the coil of reverse tape relay RT is cut off and relay RT is de-energized, opening its contacts RT1a and de-energizing parity relay P. Opening of contacts P1a opens the circuit for the coil of relay X. However, this relay is delayed on drop-out by the charge on the capacitor C15 connected in shunt with the coil thereof. Contacts P1*b* close in the circuit for the relay Z. When relay X drops out contacts X3*b* close. Relay 2D now picks up quickly opening contacts 2D1*b* and de-energizing relay Z which opens the reader clutch circuit and stops the reader. Contacts X2*a* open and solenoid 58 is de-energized which shifts the shift arm 45 to the forward drive position. After a time delay determined by resistor R5 and shunt capacitor C7, relay 3D picks up and contacts 3D1*a* close, energizing the coil RCC of the reader clutch and the incremental drive in the forward direction begins.

If the parity error does not occur the second time, tape reading in the forward direction continues normally. If the parity error occurs a second time, the computer and control then operates to de-energize stop tape relay ST to stop the reader completely.

This function takes place within the computer and control and interrupts the signal supplied to the start tape relay ST, which opens the contacts ST1*a* in the circuit for reader clutch coil RCC which stops rotation of reader drive shaft 23.

During this operation, since only a relatively small amount of tape is fed in the reverse direction, it is unnecessary to reverse the supply reel motor. However, the take-up reel motor is reversed by contacts of the X relay. It will be recalled that during the wind-up operation of the take-up reel, the take-up reel motor was controlled through contacts X6*b* and the tension arm operated contacts WC2, which were normally closed and which open whenever the tape loop diminishes. When relay X is energized, contacts X6*b* open and contacts X5*a* close which shifts the energization from one extremity of the split field winding 5F to the other through the contacts UWC2 operated by the tension arm 8. These contacts are closed when the tape loop is small and open when the tape is loose and thus operate to control the reverse rotation of the take-up reel to maintain a tape loop during the reverse reading operation.

*Message rewind.*—Whenever the message on the tape for a particular operation has been completely read, suitable coding in the tape may be provided to indicate the end of the message. This end of the message code is detected by the reader pin station which applies an end of the message signal to the computer and control system. The computer and control system now operates to energize the coil of rewind relay RWT and this operation continues until the message is completely rewound so that the message may be reread through the reader.

Energization of relay RWT closes contact RWT*a* in the coil circuit for relay R. This opens contacts R1*b* and closes contacts R1*a*. Contacts R1*b* de-energize relay F which promptly opens contacts F2*a* in the clutch reader circuit to de-energize the reader clutch coil RC. Thus, the reader drive shaft 23 is stopped. When relay F is de-energized, its contacts F1*b* close. This completes an energizing circuit for the coil of brake relay B which includes contacts F1*b* and the now closed contacts R1*a* of relay R. Contacts B1*a* of the relay B upon closing energize the coil D of the detent solenoid 83 which, as will be seen from FIG. 2, lifts the detent roller from engagement with the teeth of the ratchet wheel. Contacts B2*a* of the brake relay close and partially establish an energizing circuit for the coil SRB of the supply reel brake but this circuit is maintained open by contacts M3*b* until rewind is completed. Closure of contacts D1*a* of the detent solenoid energize the relay Y. When relay Y is energized, its contacts Y1*b* in the coil circuit for relay F open and its contacts Y1*a* in the circuit for the coil of relay M close. This circuit is completed through the contacts A1*b* of the relay A. This relay is presently de-energized. Contacts M1*a* and M2*a* reverse the armature connections of the supply reel motor 5. Contacts M4*b* now open and disconnect the control for the take-up reel motor and contacts M4*a* close to complete the energizing connection for the supply reel motor through the contacts S2*a* of the main switch S. Energization of the supply reel motor is now controlled through a resistor R911 in series with a resistor R9. The voltage drop across resistor R911 results in the application of a lowered armature voltage to the supply reel motor armature and this motor operates at a predetermined low speed, taking up the slack in the tape adjacent the supply reel and gradually increasing the speed of the tape sprocket wheel 10 which is now released for free rotation due to energization of the detent solenoid. Since the supply reel brake is maintained de-energized in this mode of operation, it occupies its spring released position.

Closing of contacts M4*a* also completes an energization circuit for reversing the take-up reel so that it rotates in a direction to unwind the tape. This circuit extends through the contacts X5*b* of the presently de-energized relay X, through the contacts UWC2 operated by tension arm 8 and through the split motor field and armature in series in such a way as to run the take-up reel motor 6 in a direction to unwind the tape. Contacts UWC2 are closed when the loop in the tape adjacent the supply reel diminishes a certain amount to close the motor circuit to unwind more tape and open as the loop increases. Thus, the motor is intermittently energized depending upon the requirement for the supply of tape.

Contacts M3*a* which are now closed, in conjunction with contacts UWC1 also operated by tension arm 8, complete the circuit for the take-up reel brake coil TRB. Contacts UWC1 open and close in reverse order with respect to contact UWC2. Thus, when the motor TRM is de-energized, coil TRB is energized to set the brake and when the motor TRM is energized the brake coil TRB is de-energized. Since the supply reel is powered to drag the tape through the reader, it is unnecessary to actuate the shift arm 45 to reverse the sprocket wheel drive linkage. This mechanism is in its retracted position with roller 38 riding on the low part of feed cam 30 and roller 88 riding on the high part of cam 87 which retracts the reading pin assembly 86 from tape reading position.

As pointed out hereinbefore, roller contact 18 of stop switch SS is utilized to detect the beginning of the message. This is done by moving roller 18 into a position riding along the edge of the tape, a suitable hole in the tape at the beginning of the message permitting engagement of roller 18 with the stationary contact plate 17*a* to complete a control circuit for stopping the rewind operation at the beginning of the message. To this end, contacts B3*b* which normally energize the coil SSM of solenoid 83 controlling the position of contact roller 18 are open, it being recalled that relay B is presently energized through contacts F1*b* and R1*a*. Thus the solenoid is de-energized and the contact roller engages the paper tape.

The rewind speed is increased by shunting the resistor R11 through closing of the contacts 1D1*a*. This is accomplished by energizing the coil of relay 1D by means of a delay switch DEL which is controlled by tension arm 7. Delay switch DEL is open when the tension arm is down and is closed when the tension arm is raised a predetermined amount. Thus, as the loop adjacent the supply wheel is taken up during the message rewind operation, the reel is operated at low speed and meanwhile is accelerating the tape sprocket wheel. Once the sprocket wheel is moving, the supply reel motor may be accelerated in the rewind direction. Closing of contacts DEL under this condition completes the energizing circuit for the coil of relay 1D. This relay is delayed in pick-up by an RC circuit including series resistor R12 and capacitor C8 which shunts the coil. This adds a little time to the operation in the low speed range to permit further acceleration of the tape and the tape sprocket wheel.

When the beginning of the message is reached, the roller contact circuit closes and completes an energizing circuit for the coil of relay A. Relay A upon energization opens its contacts A1*b* in the coil circuit of relay M, de-energizing this relay which switches the polarity of the supply reel motor armature circuit through closing of contacts M1*b* and M2*b*. At the same time, contacts M4*a* open in the motor circuit to de-energize the supply reel motor. Since relay B is yet energized, contacts B2*a* remain closed so that upon closing of contacts M3*b* the supply reel brake coil SRB is energized to set the brake. When contacts M4*a* open, the energizing circuit for the take-up reel motor is interrupted and the take-up reel brake coil TRB is energized in parallel with the supply reel brake coil SRB through a circuit including contacts M3*b* and B2*a* and extending through an isolating rectifier CR1 to the coil TRB of the take-up reel brake.

The de-energization of relay M results in opening of contacts M6*a* in the circuit maintaining the coil of relay B energized and which includes the contacts Y2*a* of the relay Y which is yet energized. De-energization of relay B results in opening of its contacts B1*a* in the coil circuit of the detent relay D. Thereafter, contacts D1*a* of the detent relay open, de-energizing the coil of relay Y. De-energization of relay Y results in opening of contacts Y1*a* in the coil circuit of relay M and closing of contacts Y1*b* in the circuit for coil of relay F. The control of the re-wind tape relay RWT need only be momentary, that is, sufficiently long to allow contacts M6*a* and Y2*a* in the holding circuit for the coil of relay B to close. Thereafter, the relay R may be de-energized which again closes contacts R1*b*. Thus, when contacts Y1*b* close, the relay F is energized again to maintain contacts F1*b* open in the coil circuit of relay B. Energization of the relay F closes contacts F2*a* in the reader clutch coil circuit. However, this circuit is open at contacts ST1*a* at this time. Thus, the rewind operation is brought to a stop and the circuits are reset for the next forward reading operation of the message. For the arrangement described, this may be accomplished through either manual or automatic energization of the coil of the start tape relay ST.

*Total rewind.*—In an automatic machine tool control system, if it is desired to machine a different part a new tape is required. The present tape is removed from the reader in a total rewind operation which is manually initiated. To accomplish this, tape feed switch TF is opened and the main switch S is moved to "off" position. This closes contacts S1*b* in a circuit shunting the rewind tape relay contacts RWT1. This shunt circuit also includes in series the contacts TW3*a* of a total wind relay TW. Relay TW is energized by manual closing of rewind contacts RW. This closes contacts TW3*a* and completes the energizing circuit for the coil of rewind relay R. At the same time, normally open contacts TW2*a* of relay TW are closed which energizes the coil SSM of the stop switch magnet. Thus, roller contact 18 is held away from the tape and its operation is eliminated. Contacts TW1*a* complete the circuit from the direct current supply through the contacts S2*b* to the contacts M4*a* which are now closed. The circuit for energizing the supply reel motor in the reverse direction is now completed through contacts 1D1*a*, M2*a* and M1*a*. Relay M is energized in this mode of operation by reason of the operation of relays B, D and Y as previously described, the latter of which, through closing of contacts Y1*a*, energizes the coil of relay M.

The circuit for energizing take-up reel motor TRM for unwinding the tape extends through contacts S2*b*, TW1 and M4*a* and thereafter continues through contacts X5*b* and UWC2 through half of the field winding 6F and the motor armature to the negative side of the line. When the tape is tight, contacts UWC2 remain closed so that the take-up reel motor remains energized. Since contacts M3*a* are closed, contacts UWC1 energize the take-up reel brake, whenever the tape is loose, to set the brake and prevent excessive overrun. When the tape is completely rewound, the rewind switch RW is opened which stops the rewind operation.

If it is desired to read back a particular block of code which has passed through the reader, this may be accomplished by depressing and closing a push button BR. The operation which results from closing of contacts BR is similar to that which is obtained by energization of the reverse tape relay RT and completes an energizing circuit for the coil of parity relay P. Thereafter, the reverse read operation is the same as that described in connection with the energization of reverse tape relay RT. Reverse reading with this manually initiated control can be interrupted at any time, simply by releasing the push button BR.

During forward tape feed by the indexing and feeding mechanism all of the contacts, F2*a*, Z1*a*, S3*a*, OLC and ST1*a* in the circuit for the coil RCC of the reader clutch are closed so that latch 26 is retracted and shaft 23 may rotate. To obviate tape overload, should the rate of tape feed from the supply reel be insufficient for any reason, contacts OLC are provided and adjusted to open whenever the tape loop is substantially completely removed. These contacts are also controlled by tension arm 7 and are set to open after the contacts RJ close. Normally these contacts will not operate and operate only to stop the tape feed mechanism in the event the supply reel feed should be inadequate.

Although but one embodiment of this invention has been herein illustrated and described, it will be appreciated by those skilled in the art that numerous changes in this invention both as to the details of the disclosed arrangements and as to the organization of the details may be made. By way of example, reference is made to the use of two levers 34 and 35 to actuate the respective forward and reverse drive links 41 and 42. Obviously a single linkage may be utilized involving only one lever such as 34, having the respective drive links pivoted at a common point adjacent the free extremity thereof so that each has the same stroke for driving the ratchet wheel. With regard to the electrical system and particularly with regard to the electromagnetic devices, it will be appreciated that such items as the brakes may be spring applied and electrically released instead of electrically applied and spring released as herein described. These and other equally obvious expedients will be apparent to those skilled in the art.

What is claimed is:

1. Apparatus for incrementally feeding a perforated tape in forward and reverse directions, comprising; a tape sprocket wheel disposed to engage said tape; a toothed ratchet wheel connected to drive said sprocket wheel; respective drive links disposed on opposite sides of said ratchet wheel an having extremities disposed to engage the teeth of said ratchet wheel; unidirectional rotary drive means connected to drive said drive links between retracted and driving positions with respect to said ratchet wheel; a shift mechanism operable between two positions, selectively controlling engagement of said drive links with said ratchet wheel; electromagnetic means connected to said shift mechanism and controlling movement of said shift mechanism between said two positions; mechanical means connected to said drive means and operable to stop said drive means with said drive links in retracted position; electromagnetic means connected to and controlling said mechanical means; a reader pin assembly; connections between said drive means and said reader pin assembly moving said reader pin assembly between tape engaging and retracted positions; circuit means controlled by said reader pin assembly and controlling said second-mentioned electromagnetic means to effect operation of said mechanical means to stop said drive means; and circuit means controlled by said reader pin assembly and controlling said first named electromagnetic means to effect operation of said shift mechanism from one of said two positions to the other of said two positions when said drive means is stopped.

2. Apparatus for reading and handling perforated tape, comprising; an incremental, reversible tape feed mechanism; perforated tape reading means having an electrical output; a tape supply reel disposed to supply tape to said feed mechanism; a tape take-up reel disposed to take up tape passing from said feed mechanism; respective motors connected to drive said respective reels; circuit means normally energizing said motors to drive said supply and take-up reels to supply tape to and take up tape passing from said feed mechanism, respectively; electrical means responsive to predetermined electrical outputs of said reading means for reversing said tape feed mechanism; electrical means controlled by said predetermined output and forming a part of said circuit means for de-energizing said motor connected to said supply reel; and electrical means controlled by said predetermined output and forming a part of said circuit means for reversing said motor connected to said take-up reel.

References Cited in the file of this patent

UNITED STATES PATENTS

| | | |
|---|---|---|
| 2,193,967 | Kleinschmidt | Mar. 19, 1940 |
| 2,279,353 | Van Duuren | Apr. 14, 1942 |
| 2,343,405 | Doty | Mar. 7, 1944 |
| 2,619,532 | Blodgett | Nov. 25, 1952 |
| 2,703,714 | Demby | Mar. 8, 1955 |
| 2,774,245 | Shepard | Dec. 18, 1956 |
| 2,774,246 | Happe | Dec. 18, 1956 |
| 2,782,398 | West | Feb. 19, 1957 |
| 2,819,940 | Sorrells | Jan. 14, 1958 |